[19] United States Patent
Crowe

[11] Patent Number: 4,639,714
[45] Date of Patent: Jan. 27, 1987

[54] COMBINED POWER AND CONTROL SIGNAL TRANSMISSION SYSTEM

[75] Inventor: Wayne D. Crowe, Houston, Tex.

[73] Assignee: Ferranti Subsea Systems, Ltd., London, England

[21] Appl. No.: 685,262

[22] Filed: Dec. 21, 1984

[51] Int. Cl.⁴ .......................................... H04M 11/04
[52] U.S. Cl. ............................ 340/310 R; 340/310 A
[58] Field of Search .......... 340/310 A, 310 R, 347 M, 340/310 CP, 870.02; 455/40

[56] References Cited

U.S. PATENT DOCUMENTS

| | | |
|---|---|---|
| 3,061,734 | 10/1962 | Broome . |
| 3,374,459 | 3/1968 | Rabson et al. . |
| 3,717,858 | 2/1973 | Hadden . |
| 3,742,473 | 6/1973 | Hadden . |
| 3,786,423 | 1/1974 | Martell . |
| 3,795,817 | 3/1974 | Chambaut . |
| 4,118,977 | 10/1978 | Olsen et al. . |
| 4,130,861 | 12/1978 | Laforest ........................... 340/310 A |
| 4,173,754 | 11/1979 | Feiker ............................... 340/310 R |
| 4,296,450 | 10/1981 | Paice et al. ....................... 340/310 R |
| 4,442,515 | 4/1984 | Meitzler ............................ 340/310 R |

Primary Examiner—Douglas W. Olms
Assistant Examiner—Curtis A. Kuntz
Attorney, Agent, or Firm—Norvell & Associates

[57] ABSTRACT

At a first location (A), a signal combiner (14) combines DC power from a DC power source (10) and command communication signals from a command encoder (12). An electrical cable (B) conveys the combined DC electrical power and command communication signals to a remote location (C). The command communication signals are read by a signal separator (32) and used to control a DC to AC converter (34) such that the DC to AC converter converts the DC power to a high frequency signal which is modulated in accordance with the command communication. The high frequency signal is transmitted across an inductive coupler (40) to the remote equipment. A command unit (50) separates the command communication signals from the high frequency signal to control switches (54) and the functioning of components (56) at the remote location. A rectifier (52) provides DC power to operate the controlled components. A pressure transducer (62) generates data communication signals which are transmitted uplink across the inductive coupler. The uplink data communication signals are read from the cable by a data signal separator (92) and converted by a decoder (94) to the appropriate electrical format for a man-readable display (96).

20 Claims, 6 Drawing Figures

COMBINED POWER AND CONTROL SIGNAL TRANSMISSION SYSTEM

BACKGROUND OF THE INVENTION

The present invention relates to the art of power transmission and electronic communication. Particular application is found in the concurrent transmission of electrical power and control signals to undersea and other remote installations and the invention will be described with particular reference thereto. It is to be appreciated, however, that the invention is also applicable for supplying power and communication signals to remote, relatively inaccessible, under fluid, downhole, or like locations.

Heretofore, various techniques have been used for concurrently providing power and communications to undersea and other remote locations. Commonly, separate electrical lines in a cable were used to convey electrical power and control signals.

To ensure safe interconnection and disconnection under water, inductive couplers were provided for transferring electrical power and control signals between the undersea apparatus and the cable. Conventionally, low frequency AC power voltages were transmitted from the surface along the electrical cable to the undersea inductive coupling. Higher frequency control and communication signals were transmitted concurrently along communication lines and across high frequency inductive couplers. However, inductive couplers for lower frequency AC power voltages required a relatively large transformer core for efficient power transfer. The commonly used laminated steel coupler cores were subject to corrosion, particularly by salt water. Although coatings or non-magnetic corrosion-resistant barriers could be applied to inhibit corrosion, they also increased the gap between coupler halves and diminished energy transfer efficiency.

One method for overcoming this shortcoming was to transmit high frequency AC power voltages along the power transmission cables and across the inductive coupler. Inductive coupler for high frequency signals oftentimes used ferrite pot cores which were relatively small and relatively immune to salt water corrosion. The higher the signal frequency, the smaller the core required to transmit a given power level. However, high frequency power transmission causes crosstalk on the high frequency communication lines. Further, high frequency power transmissions attenuated more quickly than lower frequency transmissions, rendering them disadvantageous for long distance power transfer and communication.

The present invention provides an improved electrical power and data signal transmission system which overcomes the above-reference disadvantages and others.

SUMMARY OF THE INVENTION

In accordance with the present invention, electrical power and communication signals are transmitted concurrently along a common electrical conductor. Preferably, the electrical communication signal is superimposed on or modulates the electrical power signal transmitted along the electrical conductor. At a remote location, the communication signal is separated from the power signal. The electrical power signal is converted to a high frequency electrical power signal which is modulated as a function of the separated electrical communication signal. After the high frequency signal is transmitted across an inductive coupler, the high frequency signal is converted to an appropriate DC or other electrical power signal and to a communication signal. In the preferred embodiment, the power signal comprises a DC power signal, and the communication signal comprises a low frequency modulated signal, a digital signal, or the like.

In accordance with another aspect of the invention, a combined electrical power and communication signal transmission apparatus is provided. A source of electrical power is operatively connected with an electrical conductor. A communication signal superimposing means is operatively connected with the electrical conductor for superimposing an electrical communication signal on the electrical power signal transmitted along the electrical conductor. At a remote location, a communication separating means is provided for separating the communication signal from the electrical power signal. A variably modulated DC to AC converter is operatively connected with the power cable and the communication signal separating means for converting the electrical power signal to a high frequency signal which is modulated as a function of the communication signal. An inductive coupler is connected with the DC to AC converter for transferring the high frequency signal thereacross.

A first advantage of the present invention is the provision of a method and arrangement which enable power and communications to be transmitted on a common carrier.

Another advantage of the invention is the elimination of interference and crosstalk between the power and communication channels.

Further advantages reside in relatively low power loses and efficient power transfer across relatively small inductive couplers.

Yet other advantages of the present invention are attributable to redundant operation, greater immunity to salt water corrosion, simplified power transmission cables, and the like.

Still further advantages of the invention will become apparent to those skilled in the art upon a reading and understanding of the following detailed description of the preferred embodiments.

BRIEF DESCRIPTION OF THE DRAWINGS

The invention may take physical form in various parts and arrangements of parts, preferred embodiments of which will be described in detail in this specification and illustrated in the accompanying drawings which form a part hereof and wherein:

FIG. 1 is a schematic diagram of a circuit for concurrent transmission of electrical power and downlink control signals to undersea modules or the like;

DETAILED DESCRIPTION OF THE PREFERRED EMBODIMENTS

Figure 1:
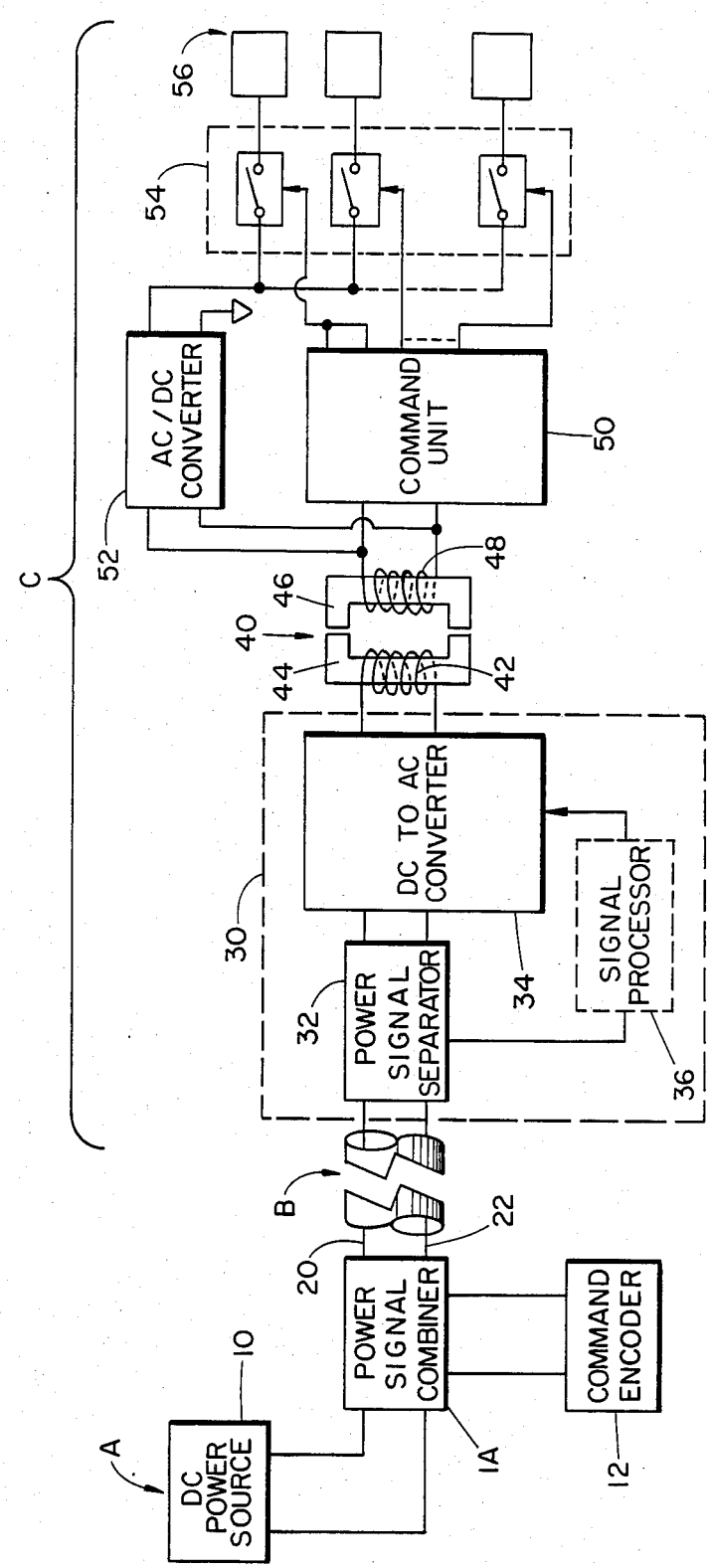

Referring now to the drawings wherein the showings are for purposes of illustrating preferred embodiments of the invention only and not for purposes of limiting same, FIG. 1 shows a first station A, which is commonly disposed on land, which provides appropriate electrical power and command signals to a transmission cable or conductor B. The cable extends from the first station to a second, controlled station C, which is commonly disposed in a remote, underwater location.

The first station A includes a source 10 of electrical power, particularly DC electrical power. A command encoder 12 selectively generates command signals which are superimposed by a signal combiner 14. In the preferred embodiment, the command encoder generates low frequency AC command communication signals. The signal combiner 14 may comprise a transformer or other components which combine the DC electrical power signal and the low frequency command communication signal.

The various preselected commands are distinguished by frequency modulating the command communication signal. In the one embodiment, preselected frequency shifts of the AC command communication signal designate ones and zeros of a digitally encoded transmission. In another embodiment, a plurality of discrete frequencies each designate a different one of the preselected commands. In yet another embodiment, the command encoder provides a digital command communication signal by superimposing square wave pulses on the DC electrical power signal. The binary ones and zeros may be designated by the presence and absence of such a pulse, by pulses of differing polarity, or the like.

The cable B includes a pair of wires 20, 22 having good conductivity and with good insulation therearound. When transmitting DC electrical power, capacitance between the wires is of relatively small importance.

At the remote station C, the cable is connected with a coupler circuit 30 for converting the command signal encoded DC electrical power signal into a high frequency signal encoded in accordance with the command. A power and command signal separator 32 reads the encoded command signal and produces an output signal in accordance therewith. For a frequency modulated AC command signal, the signal separator circuit 32 preferably includes a voltage level detector which detects variations in voltage during each cycle of the AC command signal. The voltage level detector will also detect a digital command communication signal which includes a plurality of pulses or pulses of opposite polarity. The separator circuit may include filter circuits for passing AC components but not DC components, transformers, and other circuits which produce an output which varies in proportion to the selected control communication signal. The output of the signal separator circuit 32 is connected with a DC to AC converter 34 to control the frequency modulation of the converter in accordance with the control communication signal. A filter and rectifier (not shown) may advantageously be provided to assure that only DC power is received by the DC to AC converter.

Optionally, a signal processor 36 may be interconnected between the signal separator 32 and the DC to AC converter 34. The signal processor is preferred when the command communication signal is digitally encoded. The signal processor reads the appropriate ones and zeros, ascertains the transmitted control signal, and causes the converter to modulate the high frequency signal correspondingly.

In the preferred embodiment, the DC to AC converter produces an output with a constant frequency and variable pulse width. The control signal modulates the output high frequency signal by varying the pulse width in accordance with the control signal. The exact frequency of the high frequency signal is selected in accordance with the construction of an inductive coupler 40. Specifically, the high frequency is selected to coincide with the optimal transfer frequency of a primary ferromagnetic core 42, preferably a ferrite composition. Alternately, the control signal may vary the frequency of the high frequency signal about the optimal transfer frequency.

The modulated high frequency signal is applied to a primary winding 42 which is magnetically coupled to a primary ferromagnetic core 44, preferably of a ferrite composition. The primary core is magnetically coupled to a secondary ferromagnetic core 46. Secondary windings 48 which are wrapped around the secondary magnetic core convert the transferred magnetic signals back into a modulated high frequency electrical signal.

The inductivity coupled remote equipment includes a command unit 50 and a power supply 52 connected with the secondary coupler winding 48. The command unit reads the frequency encoded command signal and causes a preselected response. Specifically, the control unit causes one or more of switches 54 to be closed for supplying power to one or more components 56, or to be opened for terminating the supply of power thereto. In this manner, signals from the first station A control various remote components, such as test circuits for testing various physical conditions adjacent the equipment, motive power means for moving the equipment, lights, heaters, pumps, or the like.

The exact command unit construction varies with the selected frequency modulation encoding scheme. In the preferred embodiment in which the width of square wave pulses is varied, the command unit rectifies the high frequency signal. The voltage of the rectified high frequency signal varies in proportion to the width of the square wave. By comparing the magnitude of the rectified high frequency signal with preselected magnitudes, the appropriate switch(es) can be closed. For example, the rectified high frequency signal magnitude can be digitized and used to address a pre-programmed memory, such as a PROM chip. Alternatively, if the frequency is varied to encode the command signal, a series of descending frequency filters may compare the high frequency signal with preselected frequencies and address the memory.

Figure 2A:
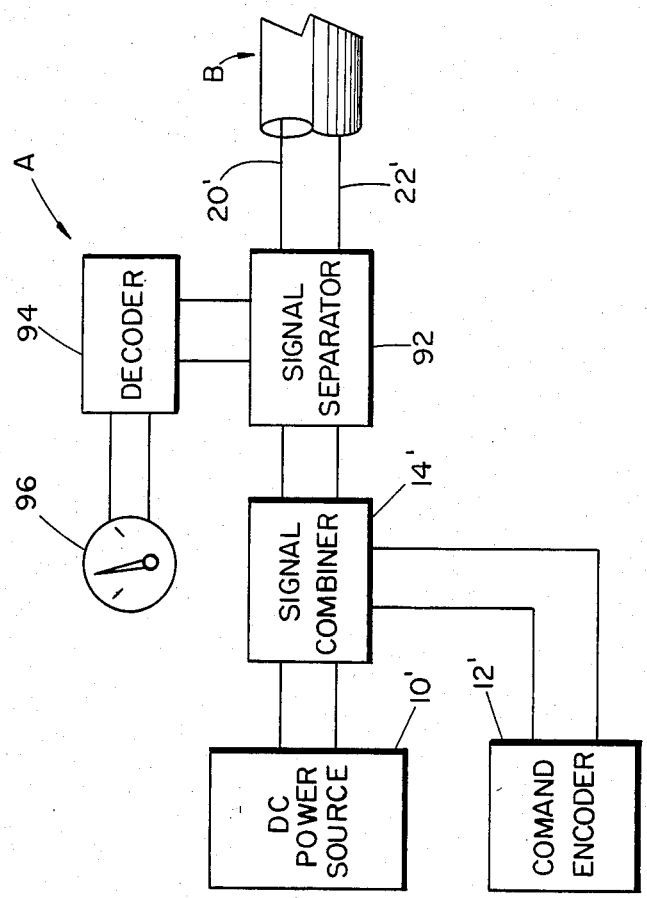
FIGS. 2A and 2B together illustrate a circuit diagram in accordance with the present invention in which electrical power is transmitted concurrently along the same power conducting cable as downlink command communications and uplink data communications in a half duplex mode; and, FIGS. 3A, 3B, and 3C illustrate electrical wave forms in conjunction with the power and communication signal transmissions.
Figure 2B:
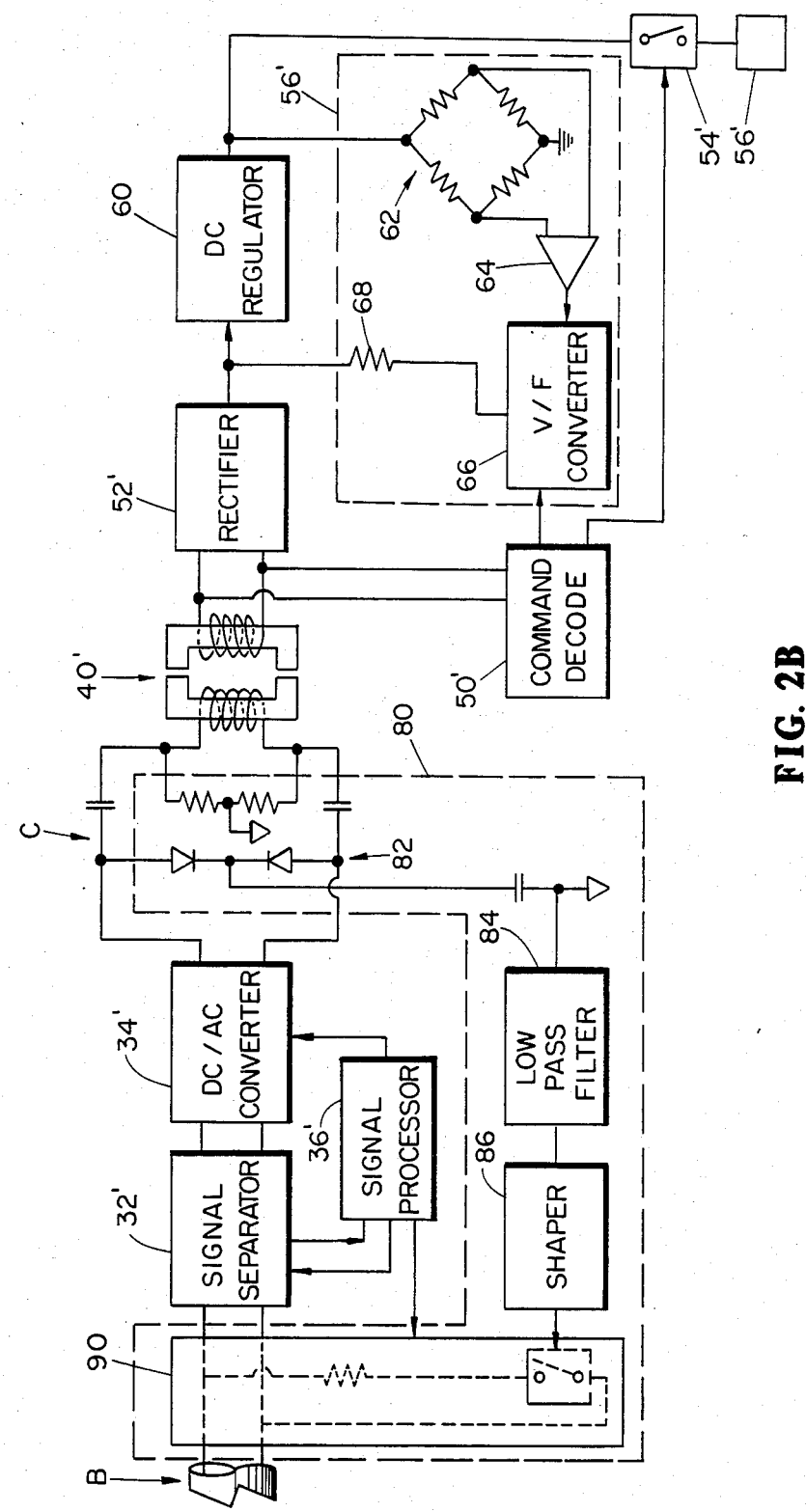

FIGS. 2A and 2B illustrates a combined electrical power, downlink control communication, and uplink data communication system in which like components of FIG. 1 are identified by like reference numerals with a primed (') suffix and new components are identified by new numerals. The first station A includes a DC power source 10', and command signal encoder 12', and a signal combiner 14' for combining the DC power and command communication signals. A wire pair 20', 22' of the cable B conveys the encoded power signal to the remote station C.

A power and command communication signal separator 32' separates the command communication signal from the power signal. A signal processor 36' converts the command signal into an appropriate modulation control for a DC to AC converter 34'. The DC to AC converter produces a high frequency signal which is modulated in accordance with the command communication signal to convey the command contained therein to and across an inductive coupler 40'. Again, the signal processor may modulate the frequency, pulse width, or other frequency related functions of the DC to AC converter 34'.

The high frequency signal is electromagnetically conveyed to a first detachable portion of an inductive coupler 40'. A command decode unit 50' and a rectifier 52' are connected with a second magnetically coupled portion of the inductive coupler. The command decode unit monitors the encoded frequency modulation and derives the corresponding commands therefrom to control switches 54' and components 56'. The rectifier 52' converts the high frequency signal to a DC power signal. In the embodiment in which the signal processor 36' modulates the pulse width of the DC to AC converter 34' while holding its frequency constant, the rectified voltage at the output of rectifier 52' varies with the command signal. Accordingly, in that embodiment, the command decode unit may be connected with the downstream end of the rectifier.

A DC regulator 60 converts the variable DC component from the rectifier 52' into a regulated DC power source, eg., 7.5 VDC. One of the controlled components 56' is a condition monitor such as a full bridge pressure transducer 62. The condition monitor is powered by the regulated DC power signal to produce an output which varies in coordination with a monitored condition, such as pressure. An amplifier 64 adjusts the amplitude of the output of the transducer to the appropriate level for a voltage to frequency converter 66. The voltage to frequency converter produces an output signal whose frequency varies in proportion to changes in the monitored condition. The voltage to frequency converter cyclically connects a load 68 across the rectifier with a frequency or periodicity which again varies with the sensed condition. Because the magnitude of the load 68 is large relative to the remainder of the circuit, connecting the load across the rectifier causes a significant increase in the amount of current drawn, and which increase is detectable across the inductive coupler 40'.

Figure 3A:
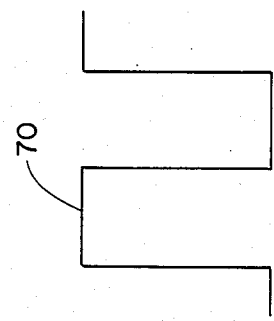
Figure 3B:
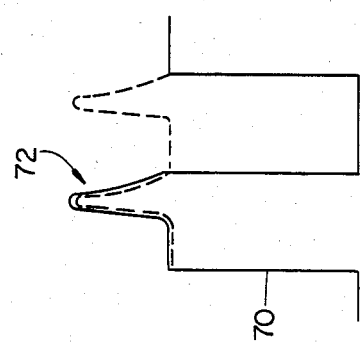
Figure 3C:
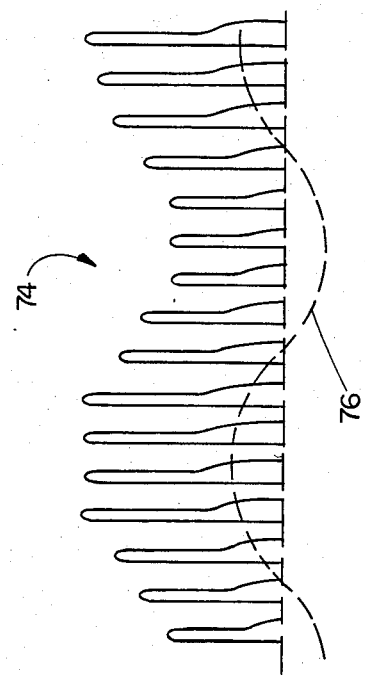

Specifically, with reference to FIGS. 3A, 3B, and 3C, the output of the DC to AC converter 34' is a square wave 70 of fixed amplitude and frequency, and whose pulse width is modulated in proportion to the control signal. As illustrated in FIG. 3B, each time the established magnetic field within the inductive coupler collapses, an inductive flyback voltage spike 72 occurs. The amplitude or energy content of each flyback voltage spike is dependent upon the load which is connected with the inductive coupler. The flyback voltage spikes have a greater amplitude or energy content when a smaller load is applied and a smaller amplitude or energy content when a larger load is applied. That is, the magnitude of the flyback voltage spikes varies or is modulated with the periodic application of the load 68. As illustrated in FIG. 3C, when the square wave from the DC to AC converter 34' is filtered out, a flyback voltage spike train 74 is produced. The amplitude and energy content of the flyback voltage spike train 74 varies with an envelope 76 which analogously varies with the frequency of the applied load 68.

Referring again to FIGS. 2A and 2B, a decoder circuit 80 detects the variations in the electrical load applied by the variable load or load modulator means 68 and transfers the information around the DC to AC converter to the cable B. A load modulation detector 82 separates the flyback voltage spikes 72 from the square wave 70 and converts the flyback spikes to the envelope or oscillating signal 76 which oscillates at the same frequency as the frequency at which the voltage to frequency converter 66 applies the load 68. A low pass filter 84 and a shaper 86 convert the envelope into a square wave whose frequency is the same as the voltage to frequency converter 66. A signal combining means 90 superimposes the data communication information from the shaper 86 onto the cable B.

Various techniques known in the art may be utilized in superimposing the data communication signal. As a first alternative, the downlink control communication signals and the uplink data communication signals may be duplexed or alternated. The signal processor 36', under appropriate controls from the command encoder 12', may alternately enable the signal combiner 90 and disable the signal separator 32', and disable the signal combiner 90 and enable the signal separater 32'. Alternately, the encoding techniques for applying the downlink control communication signals and the uplink data communication signals may be such that both may be conducted simultaneously along the cable B without interference.

As a second specific alternative, the downlink communications may be encdoded with a frequency modulated low frequency voltage signal and the uplink communications may take the form of a current modulation. For example, as shown in phantom in FIG. 2B, a resistive load may be connected between the hot wire of the cable B and ground by a switch controlled with the shaper 86 such that the load is applied with the same periodicity as load 68 which, in turn, is applied in proportion to the monitored condition.

As yet another alternative, the uplink and downlink communications may both be frequency modulations in significantly different frequency ranges such that the superimposed signals may be readily filtered or separated. As a fourth alternative, the downlink communications may be digitally encoded with square wave pulses of a first polarity and the uplink communications may be digitally encoded with square wave pulses of the opposite polarity. With appropriate filters in the signal separator 32', the uplink communications could be separated and discarded such that they do not affect the modulation of the DC to AC converter 34'.

With continuing reference to FIGS. 2A and 2B, the first station A further includes an uplink communication signal separator 92 which separates the uplink data communication signal from the DC power signal and downlink command signals on the cable B. An appropriate decoder 94 for the selected uplink encoding technique converts the uplink communication to an appropriate format for display. For example, the decoder 94 may convert the uplink data communication to a voltage which varies in proportion to the frequency of the voltage to frequency converter 66, hence, with changes in the sensed condition. The analog voltage is applied to a meter or other man-readable display 96 which provides an indication of the sensed condition.

The invention has been described with reference to the preferred embodiments. Obviously, modifications and alterations will occur to others upon a reading and understanding of this specification, it is intended to include all such modifications and alterations insofar as they come within the scope of the appended claims or the equivalents thereof.

Having thus described the invention, it is now claimed:

1. A method of concurrently transmitting electrical power and communication signals from a source station to a remote station containing controllable power consuming components, the method comprising:
    transmitting electrical power along an electrical conductor;
    superimposing an electrical communication signal on the electrical power along the electrical conductor for relating command information from the source station to the remote station;
    at a remote station, separating the communication signal from the electrical power;
    converting the electrical power to a high frequency signal which is encoded as a function of the separated communication signal;
    transmitting the encoded high frequency signal across an inductive coupler;
    deriving a control signal from the high frequency signal which is transmitted across the inductive coupler which varies in accordance with the communication signal to control operations of the power consuming components; and
    powering the components at the remote station with the high frequency signal transmitted across the inductive coupler.

2. The method as set forth in claim 1 wherein the communication signal comprises an oscillating signal which is encoded by frequency modulation.

3. The method as set forth in claim 1 wherein the communication signal is digitally encoded.

4. The method as set forth in claim 1 wherein in the electrical power to high frequency signal converting step, the high frequency signal comprises a series of square waves of constant amplitude and frequency and is encoded by varying the width of the square waves.

5. The method as set forth in claim 1 further including the step of transmitting data signals along the electrical conductor in the opposite direction to the communication signals.

6. The method as set forth in claim 1 wherein the electrical power comprises DC electrical power.

7. The method as set forth in claim 6 further including the step of converting the high frequency signal transmitted across the inductive coupler into DC electrical power for powering the components at the remote station.

8. The method as set forth in claim 7 further including the steps of:
    applying a load to the electrical power transmitted across the inductive coupler with a frequency which varies in proportion to a sensed condition to cause flyback voltage spikes at the inductive coupler which vary in accordance with the frequency of the applied load; and,
    applying a signal to the electrical conductor which varies as a function of the variations in the flyback voltage spikes such that data indicative of the sensed condition is transmittd along the electrical conductor.

9. The method as set forth in claim 8 further including the steps of separating the data signals from the electrical conductor, and providing a man-readable display indicative of the sensed condition.

10. A method of concurrently transmitting electrical power and command communication signals from a source station to a remote station containing power consuming equipment, the method comprising:
    transmitting DC electrical power from a source of DC electrical power at the source station over an electrical conductor to the remote station;
    concurrently transmitting an electrical command communication signal along the electrical conductor from the source station to the remote station;
    at the remote station, converting the DC electrical power to an AC electrical signal which is frequency modulated in accordance with the command communication signal;
    transmitting the AC signal across a magnetically coupled, selectively separable inductive coupler which is electrically connected with the equipment at the remote station to provide electrical power thereto; and
    deriving a control signal from the transmitted AC electrical signal and related to the frequency modulation of the AC electrical signal to control operations of the remotely located equipment.

11. The method as set forth in claim 10 further including the steps of generating data communication signals at the remotely located equipment, and transmitting the data communication signals across the inductive coupler and along the electrical conductor to the source station.

12. The method as set forth in claim 11 further including at the source station, converting the data communication signals to a man-readable display.

13. An apparatus for concurrently transmitting electrical power and communication signals from a source station to equipment at a remote station, the apparatus comprising:
    a source of electrical power at the source station for powering the equipment at the remote station;
    a signal encoder at the source station for generating communication signals;
    a signal combining means for combining the electrical power and the communication signals, the signal combining means being operatively connected with the source of electrical power and the signal encoder;
    an electrical conductor operative connected with the signal combining means and extending to the remote station;
    a communication signal separating means for separating the communication signal from the electrical power at the remote station;
    an AC converting means at the remote station for converting the electrical power to a high frequency electrical sign, the AC converting means being operatively connected with the electrical conductor and being operatively connected with the communication signal separating means such that the AC converting means generates a high frequency electrical signal which is encoded in accordance with the communication signal;
    an inductive coupler which is operatively connected with the AC converting means and the remotely located equipment for magnetically conveying the high frequency signal therebetween; and
    the remote equipment including a communication signal decoding means for deriving a control signal from the high frequency signal for controlling operation of the remote equipment.

14. The apparatus as set forth in claim 13 wherein the AC converter comprises a DC to AC converter.

15. The apparatus as set forth in claim 14 further including a signal processor operatively connected with the communication signal separating means and the DC to AC converter for controlling frequency modulation of the DC to AC converter in accordance with the separated communication signal.

16. The apparatus as set forth in claim 13 further including means for generating data communication signals at the remote station, the data communication signal generating means being operatively connected with the inductive coupler for supplying data communication signals thereto.

17. The apparatus as set forth in claim 16 further including data communication signal transferring means operatively connected with the inductive coupler for receiving data communication signals therefrom and being operatively connected with the electrical conductor for applying signals which vary as the data communication signals thereto.

18. The apparatus as set forth in claim 17 further including data communication signal separating means for reading the data communication signals from the electrical conductor.

19. The apparatus as set forth in claim 13 wherein the remote equipment further includes a rectifier for rectifying the high frequency signal to provide a remote equipment DC power source.

20. The apparatus as set forth in claim 19 wherein the remote equipment further includes a plurality of switches which are operatively connected to the remote equipment DC power source and controlled by the communication signal decoding means for controlledly supplying electrical power to remote equipment components.

* * * * *